April 5, 1938.　　　　H. E. ROYS　　　　2,113,384
ELECTRIC MOTOR
Filed Feb. 28, 1935
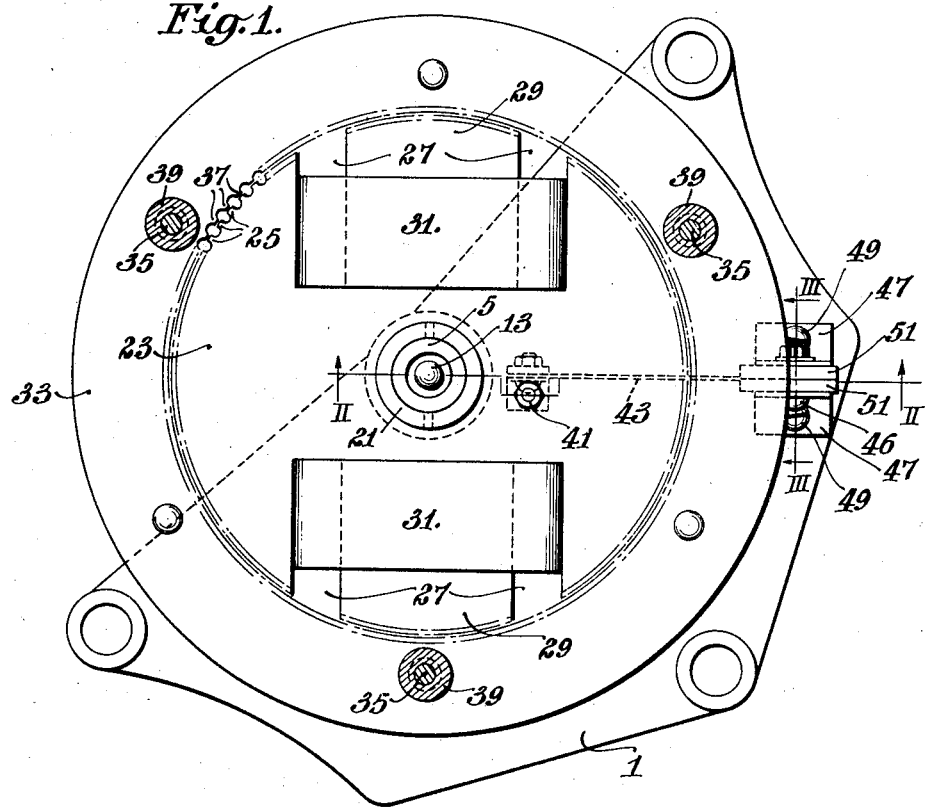
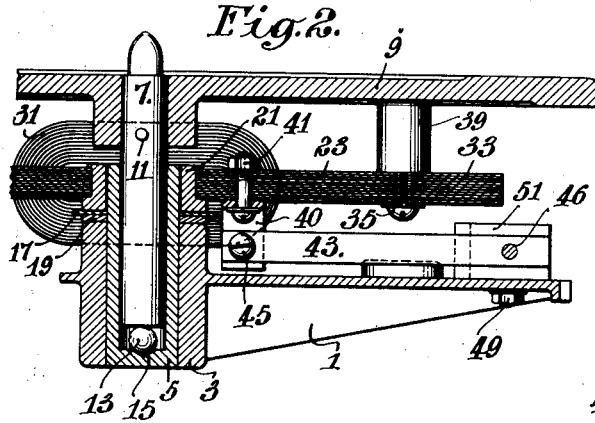
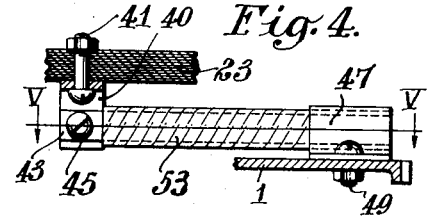
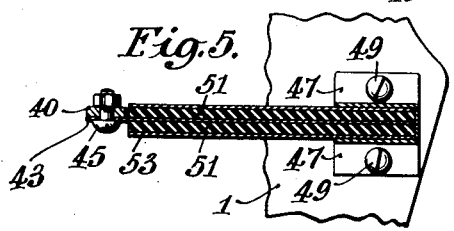
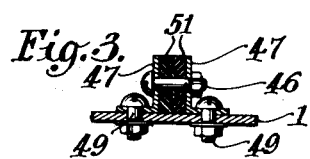
INVENTOR:
Henry E. Roys,
BY JR Goldsborough
ATTORNEY.

Patented Apr. 5, 1938

2,113,384

UNITED STATES PATENT OFFICE 2,113,384

ELECTRIC MOTOR

Henry E. Roys, Haddon Heights, N. J., assignor to Radio Corporation of America, a corporation of Delaware Application February 28, 1935, Serial No. 8,664

15 Claims. (Cl. 172—275)

This invention relates to electric motors, and more particularly to a synchronous motor suitable for use in apparatus where it is desired to drive a member at as nearly absolutely uniform speed as possible, as in phonographs, moving picture machines, television apparatus, timing devices, and the like.

In one type of synchronous alternating current motor used in phonographs, for example, the turntable is coupled to an annular rotor which surrounds a concentric stator. Now, it is well known that changes in voltage of the alternating current supply and changes in load upon the rotor produce variations in the speed of the rotor which, in turn, results in obnoxious variations in pitch of the reproduced sound. To overcome this, it has been proposed to permit the stator to oscillate to a slight extent about the rotor axis and to restrain the oscillation frictionally. This, however, does not adequately dissipate the energy developed by the oscillating stator, since frictional damping is insufficient for this purpose.

The primary object of my invention is to provide an improved synchronous motor of the type heretofore noted which will be free from the defects and disadvantages of prior art motors of this type.

More specifically, it is an object of my invention to provide an improved synchronous motor for phonographs in which oscillation of the stator will be eliminated to an extent such that whatever oscillation thereof may take place will be negligible so far as its undesirable effects upon the rotation of the turntable is concerned.

Another object of my invention is to provide, in a synchronous motor of the type set forth, means for gradually dissipating the energy developed therein upon oscillation of the stator, whereby such oscillation will be very largely, if not practically entirely, eliminated.

Still another object of my invention is to provide an improved synchronous motor for phonographs which will drive the turntable at a more uniform speed than was possible with similar motors previously employed.

A further object of my invention is to provide an improved synchronous motor as aforesaid wherein the rotor movement is effectively damped to provide uniform rotation thereof.

Still a further object of my invention is to provide an improved synchronous motor of the type specified wherein the vibrations normally transmitted to the frame thereof as a result of oscillation of the stator is practically entirely eliminated.

It is also an object of my invention to provide an improved synchronous motor of the type aforesaid which is inexpensive of manufacture, which readily lends itself to rapid quantity production, and which is highly efficient in use.

In accordance with my invention, I limit the extent of oscillation of the stator, as in the prior art, but in conjunction with the means for limiting the oscillation, I employ damping means of a nature such that when a distorting force is applied thereto, the molecules thereof are subjected to an inertia action, and which, while subject to facile deformation under the action of a distorting force, returns to its normal shape only slowly upon the removal of the distorting force. Thus, oscillation of the stator is effectively dampened out and the rotor rotates at a uniform speed at all times.

The novel features that I consider characteristic of my invention are set forth with particularity in the appended claims. The invention itself, however, together with additional objects and advantages thereof, will best be understood from the following description of a specific embodiment thereof when read in connection with the accompanying drawing in which:

Figure 1 is a plan view of my improved motor with the turntable and spindle removed, Figure 2 is a sectional view on the line II—II of Figure 1, Figure 3 is a sectional view on the line III—III of Figure 1, Figure 4 is a fragmentary view showing a side elevation of a modified form of damping device in accordance with my invention, and Figure 5 is a sectional view on the line V—V of Figure 4.

Referring more specifically to the drawing, wherein similar reference characters designate corresponding parts throughout, there is shown a supporting frame 1 provided with a hub 3 in which a bushing 5 is received, the upper end of the bushing 5 extending beyond or above the hub 3. A spindle 7 to which a record supporting device or turntable 9 is secured, as by means of a pin 11, is rotatably mounted in the bushing 5 and rests upon a thrust bearing 13 seated in a conical depression 15 in the bottom of the bushing 5.

Mounted on the upper extension of the bushing 5 for rotation thereabout and supported on the upper end of the hub 3 through a pair of washers 17 and 19, respectively preferably of metal and leather, is a collar 21 which is staked or otherwise suitably secured to a plate-like laminated stator 23. The stator 23 is provided with a plurality of peripheral teeth 25 constituting pole faces and has a plurality of inwardly extending parallel slots 27 which form a pair of diametrically opposed tongue-like portions 29. A pair of coils 31 is fitted over the tongues 29 and they are suitably connected to each other and to a source of alternating current supply for energizing the motor to supply the necessary magnetic attraction between the stator 23 and an annular rotor 33 which is secured to the turntable 9, as by means of bolts 35, and is concentric with the stator 23. The rotor 33 is built up of the same number of laminations as the stator 23 and it is provided with a series of internal teeth 37 of substantially the same arcuate length as the teeth 25 and also constituting pole faces for cooperation with the pole faces 25. A series of spacing sleeves 39, each surrounding a bolt 35, serves to so space the rotor 33 from the turntable 9 that, when the spindle 7 rests on the thrust bearing 13, the rotor 33 is horizontally aligned with the stator 23.

The structure thus far described is more or less conventional and does not, per se, constitute a part of my invention. It will be noted that the stator has been described not as a stationary member, as the term "stator" would imply, but as rotatable about the bushing 5 by reason of its being fixed to the collar 21. In order to limit the extent to which the stator may rotate, there may be provided an L-shaped bracket member 40, the horizontal leg of which is secured to the stator 23, as by a bolt and nut 41, and to the vertical leg of which is secured one end of a flat resilient strip 43, as by a bolt and nut 45, the strip 43 constituting a spring adapted to flex in a plane parallel to that of the stator 23 and the rotor 33. The other end of the spring 43 is fixed to the frame 1, as by a bolt and nut 46, between a pair of brackets 47 which are secured to the frame, as by means of bolts and nuts 49, and between a pair of blocks 51 of damping material which embed said other end of the spring 43 therewithin, as clearly shown in Figure 3. In operation, the spring or strip 43 will, obviously, limit the extent of rotation of the stator 23 about the bushing 5 and, in fact, constantly tends to restrain the stator 23 against rotation or oscillation, while the blocks 51, which are preferably made of materials known commercially under the names of Glyptal, Du Pont Viscoloid, printer's roll, and other names depending upon the source of supply, act to effectively dampen out oscillations to which the stator 23 may be subjected, so as to insure uniform rotation of the turntable 9.

The aforementioned materials are peculiarly fitted for this purpose, being semi-solid in character. That is to say, although they are all solids and self supporting, or capable of holding a permanent shape, they are, nevertheless, inert and almost fluid. Specifically, the damping material employed should, preferably, have the following properties and characteristics:

1. *Mass.*—The essential characteristic of mass is that it has inertia, or resistance to change of velocity.

2. *Rigidity.*—This is one of the differences between a solid and a liquid. The material should have sufficient rigidity and mechanical strength to make it self-supporting.

3. *Damping.*—This is ordinarily most easily thought of as a property of oil. The resisting force is proportional to velocity. The material found most satisfactory for damping, in accordance with this invention, is that which, when slightly deformed or compressed, has a resisting force nearly entirely due to viscosity and hardly at all due to rigidity of the material.

The materials specified above possess the foregoing characteristics to a high degree. They have great molecular inertia and such kinematic qualities as to offer considerable resistance to the transmission of wave motion, the ratio of kinematic viscosity thereof to mass being greater than that of rubber. Apparently, the molecules of such material are capable of being subjected to an inertia action when a distorting force is applied thereto, and the material is capable of readily absorbing within itself and relatively slowly dissipating the energy supplied thereto. This property makes it especially fit for use as a damper.

The modification shown in Figures 4 and 5 is similar to that shown in Figures 1 to 3, except that the damping blocks 51 extend practically the entire length of the spring 43, so that substantially the entire strip is embedded therein. The spring strip 43 may be forced into a single block of material 51, or, where two separate strips are used, as illustrated in the drawing, a covering of tape or the like 53 may be used to hold the blocks 51 snugly against the spring strip. By providing damping strips along the entire length of the spring, better damping action is, obviously, obtained.

Although I have shown and described certain embodiments of my invention, I am fully aware that many modifications thereof are possible. My invention, therefore, is not to be restricted except insofar as is necessitated by the prior art and by the spirit of the appended claims.

I claim as my invention:

1. In a synchronous motor, the combination of an oscillatable stator, a rotor associated with said stator, and means for damping out oscillations of said stator, said damping means having sufficient rigidity to be self-supporting and having a higher ratio of kinematic viscosity to mass than rubber.

2. In a synchronous motor, the combination of an oscillatable stator, a rotor associated with said stator, and means for damping out oscillations of said stator, said damping means having sufficient rigidity to be self-supporting and having the property of readily absorbing within itself the energy developed by oscillation of said stator and relatively slowly dissipating said energy.

3. In a synchronous motor, the combination of an oscillatable stator, a rotor associated with said stator, and means for damping out oscillations of said stator, said damping means being of a character such that it has sufficient rigidity to be self-supporting and is readily subject to deformation under the influence of an external force applied thereto and only slowly returns to its original form when said force is removed therefrom.

4. In a synchronous motor, the combination of an oscillatable stator, a rotor associated with said stator, and means for damping out oscillations of said stator, said damping means having the characteristics of being semi-solid and of having relatively great molecular inertia.

5. In a synchronous motor, the combination of a frame, a stator mounted on said frame for oscillation thereon, a rotor associated with said stator, and means on said frame for damping out oscillations of said stator, said means having sufficient rigidity to be self-supporting and having the property of readily absorbing within itself the energy developed by oscillation of said stator and relatively slowly dissipating said energy.

6. In a synchronous motor, the combination of a frame, a stator mounted on said frame for oscillation thereon, a rotor associated with said stator, and means on said frame for damping out oscillations of said stator, said means having the characteristics of being semi-solid and of having relatively great molecular inertia.

7. In a synchronous motor, the combination of a frame, a stator mounted on said frame for oscillation thereon, a rotor associated with said stator, and a resilient strip extending radially outwardly from said stator, said strip having one end fixed to said stator and its other end fixed to said frame whereby to limit the extent of oscillation of said stator, and said strip being resilient in a direction circumferentially of said stator.

8. In a synchronous motor, the combination of a frame, a stator mounted on said frame for oscillation thereon, a rotor associated with said stator, means associated with said stator and with said frame for limiting the extent of oscillation of said stator, and means associated with said first named means for damping out oscillations of said stator, said second named means having sufficient rigidity to be self-supporting and having the property of readily absorbing within itself the energy developed by oscillation of said stator and relatively slowly dissipating said energy.

9. In a synchronous motor, the combination of a frame, a stator mounted on said frame for oscillation thereon, a rotor associated with said stator, resilient means coupling said stator to said frame for limiting the extent of oscillation thereof, and means associated with said resilient means for damping out oscillations of said stator, said second named means having sufficient rigidity to be self-supporting and having the property of readily absorbing within itself the energy developed by oscillation of said stator and relatively slowly dissipating said energy.

10. The invention set forth in claim 9 characterized in that at least a portion of said resilient means is embedded in said damping means.

11. The invention set forth in claim 9 characterized in that said resilient means comprises a spring extending radially outwardly from said stator and having one of its ends secured to said stator and its other end secured to said frame, and the portion of said spring adjacent said last named end being embedded in said damping means.

12. The invention set forth in claim 9 characterized in that said resilient means comprises a flat spring strip extending outwardly from said stator, said strip being substantially entirely embedded in said damping means, and said strip and damping means being anchored to said frame at the end portion thereof remote from said stator.

13. In an electric motor, the combination of a supporting frame including a hub, a bushing within said hub extending beyond one end thereof, a spindle rotatable in said bushing, a supporting device mounted on said spindle for rotation therewith, a stator mounted on the extension of said bushing and supported on said hub for oscillatory movement about said bushing extension, a rotor carried by said supporting device and cooperatively associated with said stator, and resilient means associated with said stator tending to restrain it against oscillation.

14. In combination, a supporting frame including a hub, a bushing within said hub extending beyond one end thereof, a spindle rotatable in said bushing, a stator mounted on the extention of said bushing and supported on said hub for oscillatory movement about said bushing extension, a turntable secured to said spindle, a rotor carried by said turntable in cooperative relation to said stator, resilient means coupling said stator and said frame and tending to restrain said stator against oscillation, and means substantially embedding at least a portion of said resilient means therewithin for damping out oscillations of said stator.

15. The invention set forth in claim 14 characterized in that said stator and said rotor are each comprised of a plurality of laminations, said stator being of disc-like formation and carrying a plurality of coils adapted to conduct current and said rotor being of annular formation and surrounding said stator, said stator and rotor each having a plurality of tooth-like projections forming pole faces, and characterized further in that said damping means has the property of readily absorbing within itself the energy developed by oscillation of said stator and relatively slowly dissipating said energy.

HENRY E. ROYS.